United States Patent
Naito et al.

(10) Patent No.: US 8,554,003 B2
(45) Date of Patent: Oct. 8, 2013

(54) IMAGE DATA PROCESSING APPARATUS, IMAGE DATA PROCESSING METHOD, AND COMPUTER READABLE MEDIUM

(75) Inventors: Takao Naito, Kanagawa (JP); Kazuo Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 150 days.

(21) Appl. No.: 13/295,405

(22) Filed: Nov. 14, 2011

(65) Prior Publication Data
US 2012/0269452 A1    Oct. 25, 2012

(30) Foreign Application Priority Data
Apr. 25, 2011    (JP) .................................. 2011-096942

(51) Int. Cl.
*G06K 9/36* (2006.01)
*G06K 9/46* (2006.01)

(52) U.S. Cl.
USPC ........................................ 382/244; 382/232

(58) Field of Classification Search
USPC ................... 382/232, 239, 244–246
See application file for complete search history.

(56) References Cited

U.S. PATENT DOCUMENTS

| | | | | |
|---|---|---|---|---|
| 5,852,742 A | * | 12/1998 | Vondran et al. | ................. 712/28 |
| 6,366,702 B1 | * | 4/2002 | Obara et al. | ................. 382/237 |
| 2002/0039143 A1 | * | 4/2002 | Sasaki | ........................... 348/239 |
| 2009/0027517 A1 | * | 1/2009 | Jerdev | ....................... 348/231.6 |

FOREIGN PATENT DOCUMENTS

| JP | A-11-331614 | 11/1999 |
|---|---|---|
| JP | A-2002-304624 | 10/2002 |
| JP | A-2009-003765 | 1/2009 |
| JP | A-2009-055141 | 3/2009 |

\* cited by examiner

*Primary Examiner* — Li Liu
(74) *Attorney, Agent, or Firm* — Oliff & Berridge, PLC (57) ABSTRACT

An image data processing apparatus includes the following elements. A lossless compression device performs lossless compression. A configuration controller performs control so that a first configuration including a first line memory set and a decompression circuit set and a second configuration including a second line memory set are selectively set in a reconfigurable circuit. A maximum size determining device determines the maximum size of lines of the compressed image data. An output controller performs control so that, when the maximum size is equal to or smaller than a predetermined threshold, the first configuration is set and the compressed image data is output to an image processing circuit via the first line memory set, and so that, when the maximum size is greater than the predetermined threshold, the second configuration is set and the non-compressed image data is output to the image processing circuit via the second line memory set.

12 Claims, 9 Drawing Sheets

| CONFIGURATION NUMBER | LINE MEMORY LENGTH |
|---|---|
| 1 | Config-Line(1) |
| 2 | Config-Line(2) |
| 3 | Config-Line(3) |
| ⋮ | ⋮ |
| N | Config-Line(N) |

LARGE ↓ SMALL

FIG. 10

IMAGE DATA PROCESSING APPARATUS, IMAGE DATA PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-096942 filed Apr. 25, 2011.

BACKGROUND (i) Technical Field

The present invention relates to image data processing apparatuses, image data processing methods, and computer readable media.

(ii) Related Art

In an image processing apparatus, such as a digital copying machine, a digital multifunction device (including functions of a scanner, a printer, a copying machine, etc.), image data is generated by performing line-sequential reading scanning, and image processing, such as color space conversion and various filter processing operations, is performed on the image data in the order in which elements of the image data are generated. In two-dimensional filter processing using a digital filter of, for example, N×N pixels (N is an integer of two or greater), image data representing the previous line is stored in each of line memory devices, the number of line memory devices corresponding to, for example, (N−1) lines. Then, the image data of each of those line memory devices is read in synchronization with the image data of a line which is being read, and such image data is supplied to a filter circuit. With this configuration, as the reading resolution becomes higher, the capacity necessary for the line memory devices is also increased.

SUMMARY

According to an aspect of the invention, there is provided an image data processing apparatus including: a lossless compression device that performs lossless compression for each line of image data; a configuration controller that performs control so that a first configuration and a second configuration are selectively set in a reconfigurable circuit, the first configuration including a first line memory set for retaining therein compressed image data obtained by performing lossless compression by using the lossless compression device and a decompression circuit set for decompressing the compressed image data, the second configuration including a second line memory set for retaining therein the image data in the form of non-compressed image data, a capacity of the first line memory set being determined so that a circuit scale of the first configuration is equal to or smaller than a circuit scale of the second configuration; a maximum size determining device that causes the lossless compression device to compress each of the lines of a unit of processing of the image data and that determines a maximum size among data sizes of the lines of the compressed image data; and an output controller that performs control so that, when the maximum size determined by the maximum size determining device is equal to or smaller than a predetermined threshold which corresponds to the capacity of the first line memory set, the output controller instructs the configuration controller to set the first configuration in the reconfigurable circuit and also outputs the compressed image data obtained by the lossless compression device to an image processing circuit via the first line memory set, and so that, when the maximum size determined by the maximum size determining device is greater than the predetermined threshold, the output controller instructs the configuration controller to set the second configuration in the reconfigurable circuit and also outputs the non-compressed image data to the image processing circuit via the second line memory set.

BRIEF DESCRIPTION OF THE DRAWINGS

Exemplary embodiment(s) of the present invention will be described in detail based on the following figures, wherein.

DETAILED DESCRIPTION

Figure 1:
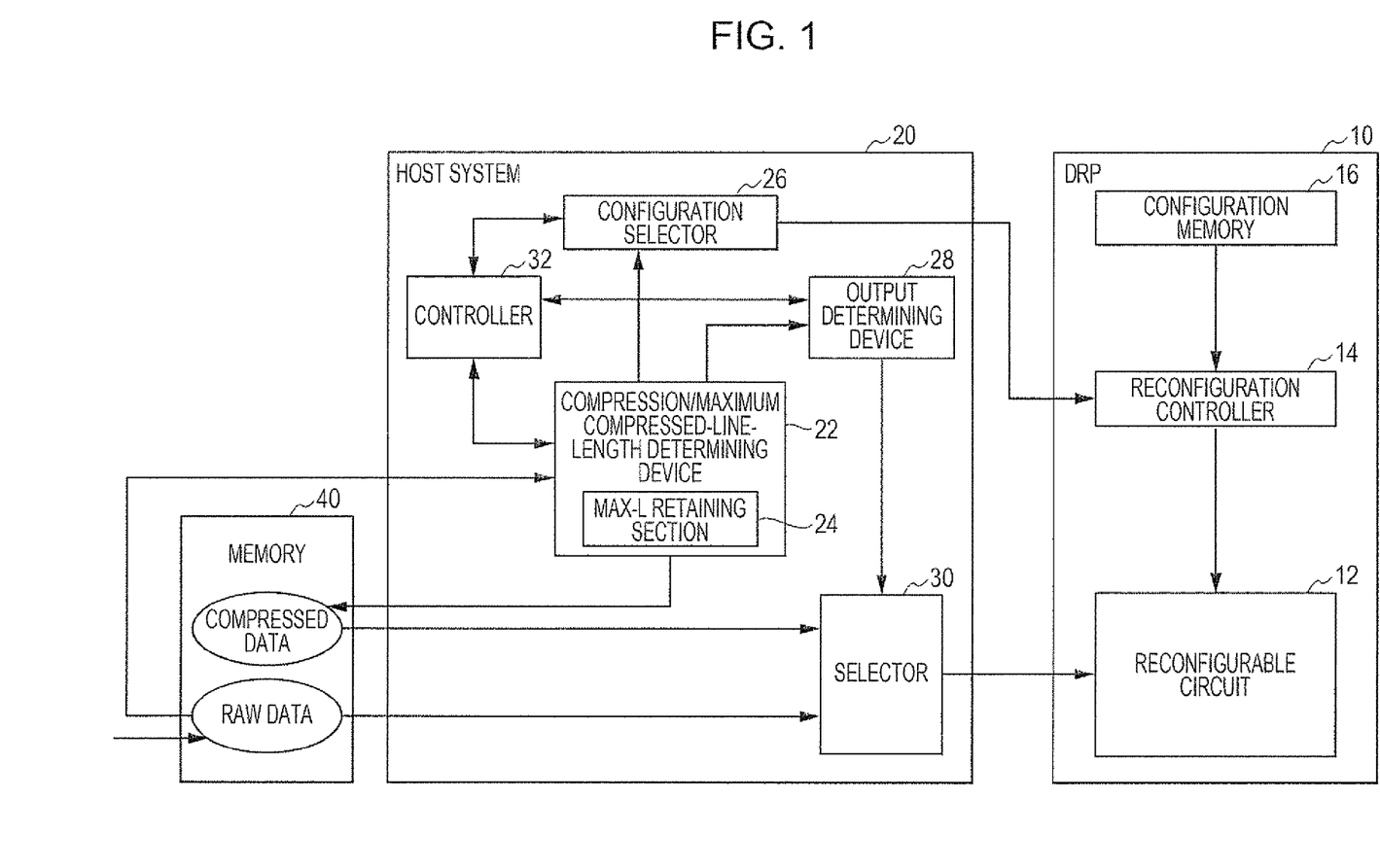
FIG. 1 is a block diagram illustrating an example of the configuration of an image data processing apparatus according to an exemplary embodiment.

An example of the functional configuration of an image data processing apparatus according to an exemplary embodiment will be hereinafter described with reference to the drawings. The image data processing apparatus shown in FIG. 1 is built in or connected to, for example, a host device, and performs image processing on bitmap image data supplied from the host device. The host device may be an image processing apparatus, such as a printer, a scanner, a fax machine, a digital copying machine, or a digital multifunction device, or may be a general-purpose computer.

The image data processing apparatus shown in FIG. 1 includes a dynamic reconfigurable processor (DRP) 10, a host system 20, and a memory 40.

The DRP 10 is a processor in which the configuration of the internal logic circuit is dynamically (e.g., during one clock) changeable (reconfigurable). An example of the DRP 10 is a DAP/DNA architecture processor disclosed in Japanese Unexamined Patent Application Publication No. 2009-3765. However, the DRP 10 is not restricted to this processor. The DRP 10 includes a reconfigurable circuit 12, a reconfiguration controller 14, and a configuration memory 16.

The reconfigurable circuit 12 includes many logic circuit elements, and the function parameters of the individual logic circuit elements and the configuration in which the logic circuit elements are connected to one another are dynamically changeable. As the reconfigurable circuit 12, a variety of existing or to-be-developed circuits, for example, the DNA disclosed in Japanese Unexamined Patent Application Publication No. 2009-3765, may be used. The DNA is an array including many logic circuit elements, which are called "processor elements" (PEs), and the configuration in which the PEs are connected to one another is reconfigurable at high speed (e.g., during one clock) in accordance with configuration data.

The reconfiguration controller 14 controls the configuration in which the logic circuit elements of the reconfigurable circuit 12 are connected to one another so as to reconfigure a data processing circuit in the reconfigurable circuit 12. In response to an instruction from the host system 20, the reconfiguration controller 14 also supplies input data received from the host system 20 to the data processing circuit reconfigured in the reconfigurable circuit 12 or returns output data from the data processing circuit to the host system 20. If the DAP/DNA architecture disclosed in Japanese Unexamined Patent Application Publication No. 2009-3765 is applied to this exemplary embodiment, the reconfiguration controller 14 is implemented by executing a control program by using a general-purpose processor core, which is called a DAP. This is, however, merely an example.

The data processing circuit is reconfigured in the reconfigurable circuit 12 in accordance with configuration data stored in the configuration memory 16. In the configuration memory 16, plural elements of configuration data are stored. The DRP 10 has a function of adding new configuration data to the configuration memory 16 or of erasing configuration data stored in the configuration memory 16 in response to an instruction from the host system 20.

The host system 20 is a control system that causes the DRP 10 to perform image processing. The host system 20 receives bitmap image data from, for example, a host device, such as a digital multifunction device, and stores the received bitmap image data in the memory 40. The host system 20 then causes the DRP 10 to process the stored image data. The host system 20 may be realized by implementing all functional modules 22 through 30, which will be discussed later, within the host system 20 by using a hardware circuit or by using software. Alternatively, some of the functional modules 22 through 30 may be implemented by using a hardware circuit and the rest of the functional modules 22 through 30 may be implemented by using software. If some or all of the functional modules 22 through 30 are implemented by using software, the corresponding software program may be executed by using (a) a processor within the DRP 10, (b) a processor mounted on the same substrate as that on which the DRP 10 is mounted, or (c) a processor of a host device, such as a digital multifunction device. Alternatively, two or more of those processors may execute the software program in a distributed manner. If the processor (a) is used, the DRP 10 itself serves as the image data processing apparatus of this exemplary embodiment. If the processor (b) is used, the substrate on which the DRP 10 and the processor are mounted serves as the image data processing apparatus of this exemplary embodiment. If the processor (c) is used, a combination of the DRP 10 and the processor of a host device serve as the image data processing apparatus of this exemplary embodiment. The memory 40 is a fast readable/writable storage device, such as a random access memory (RAM), and may be a memory built in the DRP 10 or a memory mounted on the same subject as that on which the DRP 10 is mounted. Alternatively, the memory 40 may be a memory of a host device, such as a digital multifunction device.

The host system 20 includes functional modules, such as a compression/maximum-compressed-line-length determining device 22, a configuration selector 26, an output determining device 28, a selector 30, and a controller 32.

The compression/maximum-compressed-line-length determining device 22 compresses each line (scanning line) of bitmap image data to be processed, and also determines the maximum compressed line length MAX-L of the line lengths of the compressed data (details will be given later). The compression/maximum-compressed-line-length determining device 22 includes a MAX-L retaining section 24, which is a storage area for retaining the maximum compressed line length Max-L. The configuration selector 26 selects the circuit configuration (reconfiguration), which will be discussed later, used for the reconfigurable circuit 12 on the basis of the maximum compressed line length Max-L determined by the compression/maximum-compressed-line-length determining device 22. The output determining device 28 determines, on the basis of the maximum compressed line length Max-L, whether the bitmap image data is to be output to the DRP 10 in the form of raw data or compressed data. The selector 30 selects one of raw data and compressed data of the bitmap image data in accordance with a determination result output from the output determining device 28, and supplies the selected data to the DRP 10. The controller 32 controls the other functional modules within the host system 20.

In the image data processing apparatus of this exemplary embodiment, an image processing circuit that requires plural line memory devices to perform processing, such as two-dimensional filter processing, is reconfigured in the reconfigurable circuit 12. In order to decrease the circuit scale of a line memory group which is reconfigured in the DRP 10, the compression/maximum-compressed-line-length determining device 22 compresses bitmap image data to be processed. As the compression format used by the compression/maximum-compressed-line-length determining device 22, the run-length compression format, for example, is used. The run-length compression is lossless compression that does not cause image deterioration. Note that the following control operation in this exemplary embodiment is also applicable to the use of another lossless compression format. If lossless compressed image data is input into line memory devices in this manner, the provision of circuits for decompressing the image data before the image data is input into an image processing circuit is necessary. An example of the circuit configuration set in the reconfigurable circuit 12 when compressed image data is received and processed is shown in FIG. 2.

Figure 2:
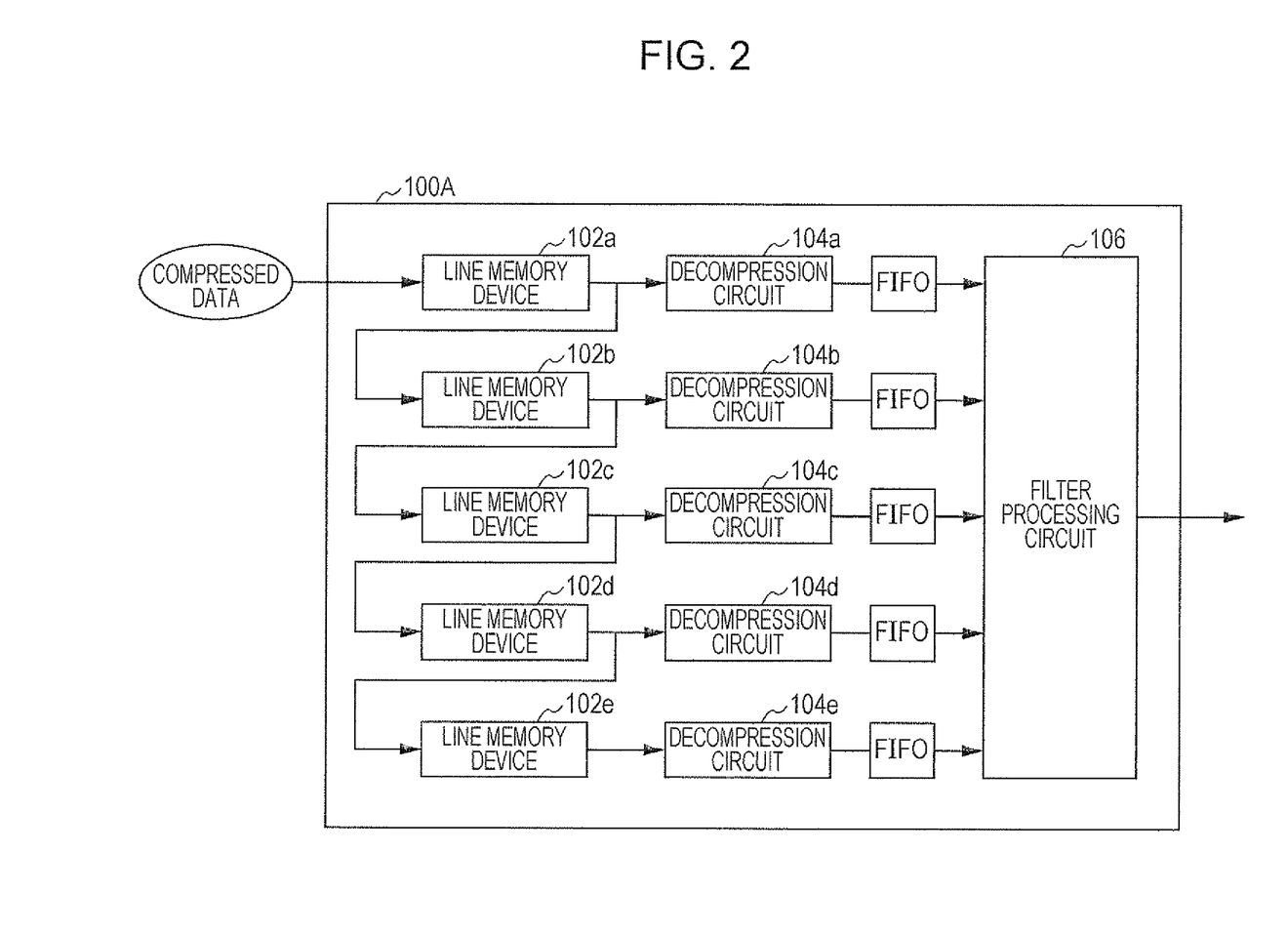
FIG. 2 illustrates an example of a circuit configuration used for compressed data and including a number of line memory devices for plural lines of compressed data.

A first circuit configuration 100A shown in FIG. 2 includes a filter processing circuit 106 and five line memory devices 102a through 102e. The filter processing circuit 106, which is an example of an image processing circuit, performs 5×5 pixel two-dimensional filter processing (one of various filter processing operations, e.g., average processing or edge enhancement processing). The five line memory devices 102a through 102e each retain compressed data of one line (scanning line) of an image contained in one page. The line memory devices 102a through 102e are First-In First-Out (FIFO) buffer memory devices. The capacities of the line memory devices 102a through 102e are equal to each other, and are determined by assuming that compressed data of one line corresponding to a predetermined compression ratio will be contained in each of the line memory devices 102a through 102e. Compressed data is input into the first line memory device 102a from the host system 20. The output side of the first line memory device 102a is connected to a decompression circuit 104a and to the input side of the second line memory device 102b. Similarly, the second, third, and fourth line memory devices 102b, 102c, and 102d are connected at their input sides to the output sides of the previous first, second, and third line memory devices 102a, 102b, and 102c, respectively, and at their output sides to decompression circuits 104b, 104c, and 104d, respectively, and to the input sides of the third, fourth, and fifth line memory devices 102c, 102d, and 102e, respectively. The output side of the fifth line memory device 102e is connected to a decompression circuit 104e. Accordingly, with this circuit configuration, when compressed data is input from the host system 20 to the DRP 10, it is first input into the first line memory device 102a and is sequentially transferred to the second, third, fourth, and fifth line memory devices 102b, 102c, 102d, and 102e. While the compressed data is being transferred through the first through fifth line memory devices 102a through 102e, five sequential lines of the compressed data are retained in the five line memory devices 102a through 102e.

The output sides of the decompression circuits 104a through 104e are connected to the filter processing circuit 106 with corresponding FIFO memory devices therebetween. The FIFO memory devices are small-capacity memory devices used for synchronizing the decompressed image data output from the corresponding decompression circuits 104a through 104e in the order of pixels and for supplying the synchronized data to the filter processing circuit 106. The FIFO memory devices are easy to provide synchronization so as to require a much smaller capacity than the amount of image data for one line. The filter processing circuit 106 performs filter processing on image data of the five adjacent lines which are sequentially supplied from the corresponding FIFOs, and sequentially outputs the pixel values of the processed image data. The pixel values that are sequentially output from the filter processing circuit 106 are returned to the host system 20.

Figure 3:
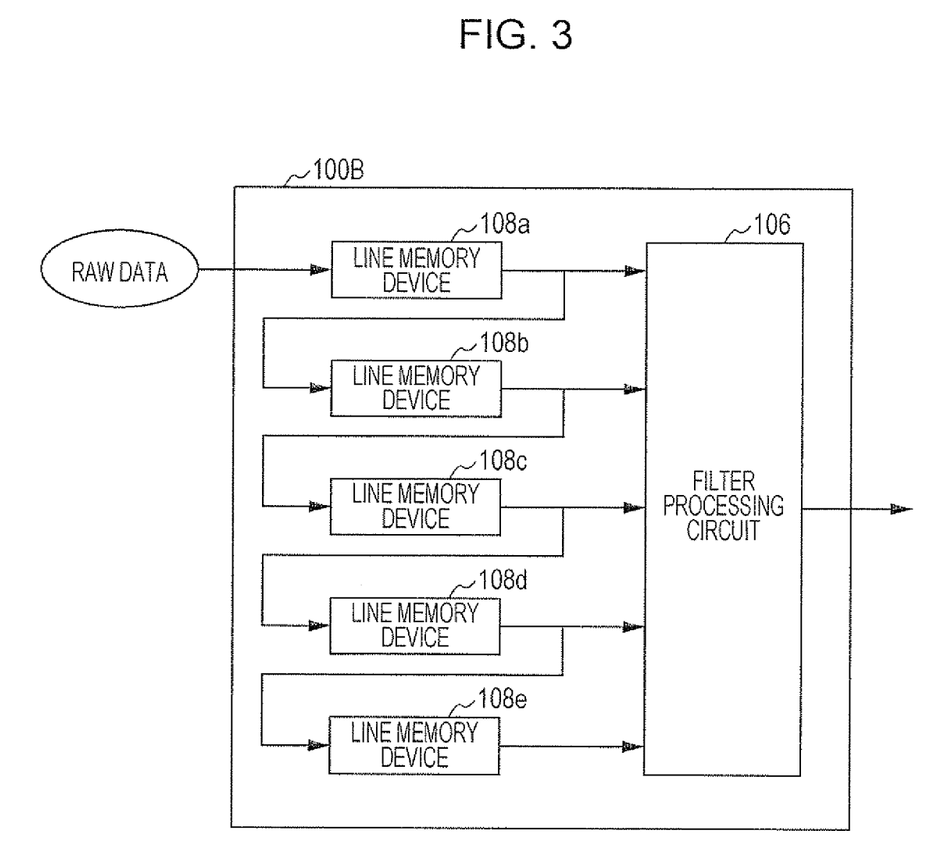
FIG. 3 illustrates an example of a circuit configuration used for raw data and including a number of line memory devices for plural lines of raw data.

In order to correctly perform filter processing, it is necessary that compressed data for one line (scanning line) be stored in each of the line memory devices 102a through 102e of the first circuit configuration 100A. However, since the compression ratio varies in accordance with the characteristics of image data to be compressed, compressed data for one line is not always containable in each of the line memory devices 102a through 102e having a predetermined capacity. If the characteristics of original image data are not compatible with the compression format to be used, the amount of compressed data may be even greater than that of the original image data. However, if such extreme cases are taken into consideration, the size of the line memory devices 102a through 102e may become too large. Thus, in this exemplary embodiment, in the case that compressed data for one line is not containable in each of the line memory devices 102a through 102e, a second circuit configuration 100B shown in FIG. 3 is provided.

The filter processing circuit 106 of the second circuit configuration 100B is the same as that of the first circuit configuration 100A. The second circuit configuration 100B includes five line memory devices 108a through 108e prior to the filter processing circuit 106. Each of the line memory devices 108a through 108e has a capacity for storing the amount of bitmap image data for one line. The first line memory device 108a is connected at its input side to the host system 20 and at its output side to the filter processing circuit 106 and to the input side of the second line memory device 108b. The second, third, and fourth line memory devices 108b, 108c, and 108d are connected at their input sides to the output sides of the previous first, second, and third line memory devices 108a, 108b, and 108c, respectively, and at their output sides to the filter processing circuit 106 and to the input sides of the subsequent third, fourth, and fifth line memory devices 108c, 108d, and 108e, respectively. The output side of the fifth line memory device 108e is connected to the filter processing circuit 106.

Raw image data is sequentially supplied line by line from the host system 20 to the second circuit configuration 100B. The input image data elements of the individual lines are sequentially transferred from the first line memory device 108a to the fifth line memory device 108e, and are also output from the output sides of the corresponding line memory devices 108a through 108e to the filter processing circuit 106 while being synchronized with each other. That is, the pixel data elements having the same pixel numbers on the individual lines are simultaneously supplied to the filter processing circuit 106. The filter processing circuit 106 executes filter processing on the image data of the five adjacent lines which are sequentially supplied through the line memory devices 108a through 108e, and sequentially returns the pixel values of the processed image data to the host system 20.

In the configuration memory 16 of the DRP 10, at least configuration data representing the first circuit configuration 100A and configuration data representing the second circuit configuration 100B are stored.

The circuit scale (the number of circuit elements used for implementing the circuit configuration) of the first circuit configuration 100A for processing compressed data is smaller that of the second circuit configuration 100B for processing raw (non-compressed) data. That is, the capacities of the line memory devices 102a through 102e are smaller than the capacities of the line memory devices 108a through 108e from which the capacities corresponding to the circuit scale of the decompression circuits 104a through 104e and the FIFOs are subtracted.

Practically, in order to effectively reduce the circuit scale for the line memory devices, the first circuit configuration 100A is made smaller than the second circuit configuration 100B by a considerable degree (e.g., several tens of percentage). For example, even when performing lossless compression, such as the run-length compression, there are quite a few types of images for which a large compression ratio can be obtained, for example, images constituted by only text or images constituted by text and graphics, such as graphs. Practically, therefore, even if the circuit scale (i.e., the capacities of the line memory devices 102a through 102e) of the first circuit configuration 100A is considerably reduced, the first circuit configuration 100A is applicable to considerably many types of images. Then, only in exceptional cases where compressed data for one line is not containable in each of the line memory devices 102a through 102e, the second circuit configuration 100B is employed. In this manner, the first circuit configuration 100A and the second circuit configuration 100B are selectively employed. With this arrangement, the number of circuit elements used for filter processing when the first circuit configuration 100A is employed can be reduced to be smaller than that when the second circuit configuration 100B is employed. Thus, circuit elements which are not used for filter processing can be used for another processing.

In this exemplary embodiment, a unit of processing of image data (the amount of image data to be processed one time) is determined in advance. Then, for the predetermined unit of processing, a suitable one of the first circuit configuration 100A and the second circuit configuration 100B is selected. The unit of processing is, for example, a page, or may be a band obtained by dividing a page. The band is an image portion constituted by a predetermined number of continuous lines (scanning lines). In the following description, the unit of processing is a page. However, the technique of this exemplary embodiment is also applicable to the use of a unit of processing other than the page (e.g., the band).

In this exemplary embodiment, when selecting the first circuit configuration 100A or the second circuit configuration 100B, the compression/maximum-compressed-line-length determining device 22 actually compresses image data of each unit of processing (i.e., each page). Then, if it is certain that the compressed data of all the lines of the unit of processing can be entirely stored in the line memory devices 102a through 102e of the first circuit configuration 100A, the first circuit configuration 100A is selected. Otherwise, the second circuit configuration 100B is selected. Additionally, at least concerning the units of processing (pages) for which the first circuit configuration 100A is selected, elements of the compressed data obtained by compressing the image data by using the compression/maximum-compressed-line-length determining device 22 for those units of processing are stored in the memory 40, and when the time has arrived to process the compressed data of one of those units, the corresponding element of compressed data is supplied to the first circuit configuration 100A of the DRP 10.

In this manner, in order to actually compress image data to determine whether the compression ratio is sufficient, it is necessary to compress the image data before performing image processing on the image data by using the DRP 10. As one of the measures to reduce the time necessary for such compression processing, while the DRP 10 is executing another processing, the compression/maximum-compressed-line-length determining device 22 compresses image data and determines whether the compression ratio is sufficient. An example of such concurrent processing will be discussed below with reference to FIG. 4.

Figure 4:
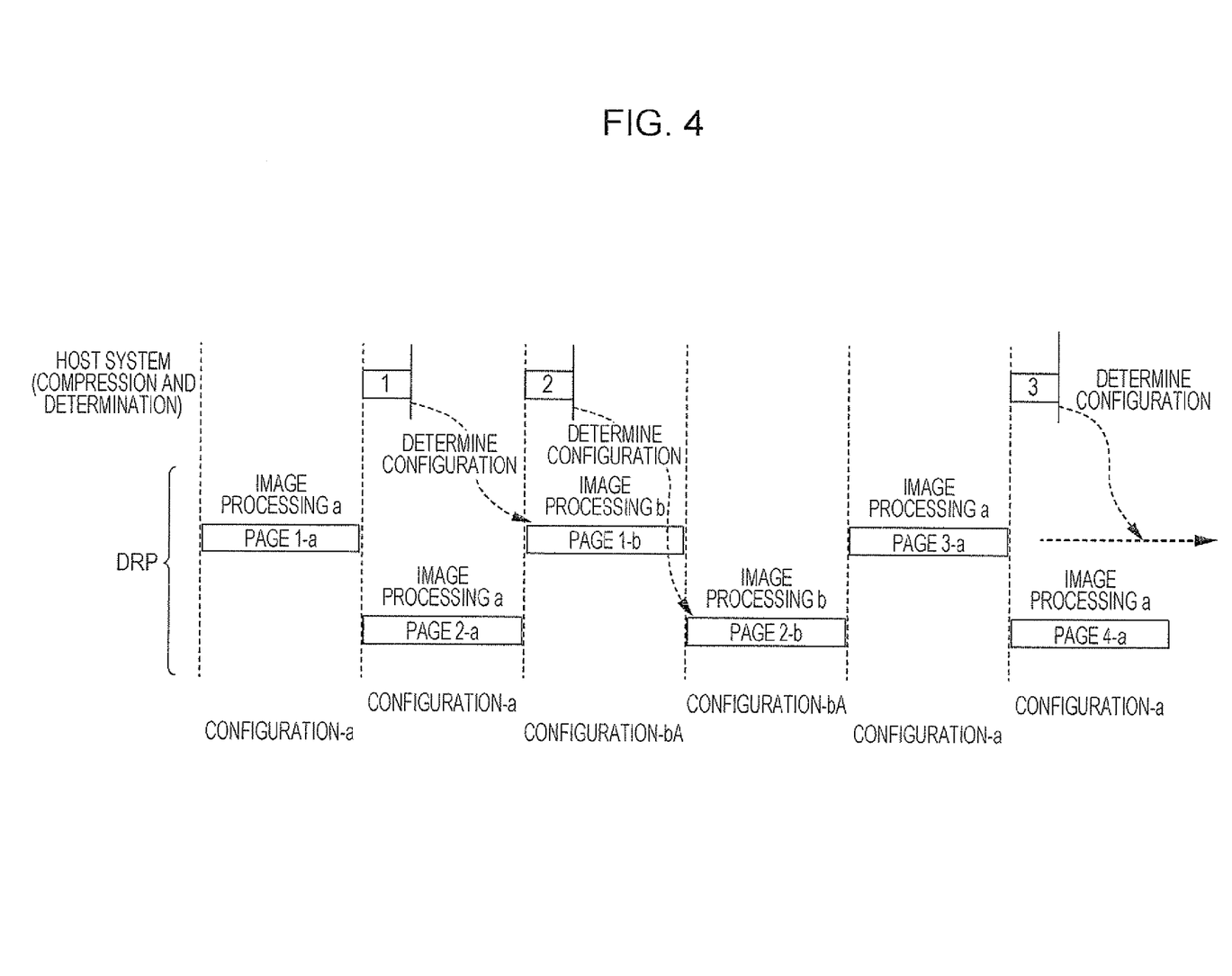
FIG. 4 illustrates an example of concurrent processing of image compression and circuit configuration determination and another processing.

In the example shown in FIG. 4, it is assumed that two types of image processing operations, i.e., image processing a and image processing b, are performed on image data by using the DRP 10. The image processing a is processing which does not require line memory devices, e.g., processing without the need to refer to the pixel values of another line, such as color space conversion. The image processing b is processing which requires a number of line memory devices equal to the number of plural lines, e.g., two-dimensional filter processing. The DRP 10 requires only a single circuit configuration to perform the image processing a. However, the DRP 10 requires two circuit configurations, i.e., the first circuit configuration 100A and the second circuit configuration 100B, by switching therebetween to perform the image processing b. In the example shown in FIG. 4, the page serves as the unit of processing.

In the example shown in FIG. 4, the circuit configuration "configuration-a" for the image processing a is set in the reconfigurable circuit 12 of the DRP 10. By using the "configuration-a", image data ("page 1-a") of the first page ("page 1") and image data ("page 2-a") of the second page ("page 2") of a document are processed. Then, while executing the image processing a on the second page, the DRP 10 causes the compression/maximum-compressed-line-length determining device 22 of the host system 20 to compress the image data of the first page subjected to the image processing a. The compressed data obtained by performing this compression processing is stored in the memory 40. The compression/maximum-compressed-line-length determining device 22 also determines, on the basis of the data length of each line of the compressed data obtained by performing this compression processing (hereinafter such a data length is referred to as the "compressed line length"), whether the configuration selector 26 is to select the first circuit configuration 100A or the second circuit configuration 100B. In this case, it is assumed that the first circuit configuration 100A (used for compressed data, shown as "configuration-bA" in FIG. 4) is to be employed. After finishing processing "page 2-a", in response to an instruction from the configuration selector 26, the reconfiguration controller 14 switches the reconfigurable circuit 12 to the "configuration bA". Then, under the control of the output determining device 28, the selector 30 selects compressed data of the first page subjected to the image processing a, and supplies the compressed data to the "configuration-bA" set in the reconfigurable circuit 12 and causes the reconfigurable circuit 12 to process the compressed data (shown as "page 1-b" in FIG. 4). While the DRP 10 is processing "page 1-b", it causes the compression/maximum-compressed-line-length determining device 22 to compress the second page subjected to the image processing a. On the basis of the compression result, the compression/maximum-compressed-line-length determining device 22 determines whether to employ the first circuit configuration 100A or the second circuit configuration 100B. If it is determined that the first circuit configuration 100A is to be employed, after performing processing on "page 1-b", the "configuration-bA" is maintained as it is, and the compressed data (shown as "page 2-b" in FIG. 4) of the second page subjected to the image processing a is processed by using the "configuration-bA". Thereafter, processing is similarly repeated on every two lines. With this processing, the circuit configuration necessary to perform the image processing b which requires line memory devices is selected during the execution time for performing the image processing a, which does not require line memory devices, on another page, or during the execution time for performing the image processing b on the preceding page.

Figure 5:
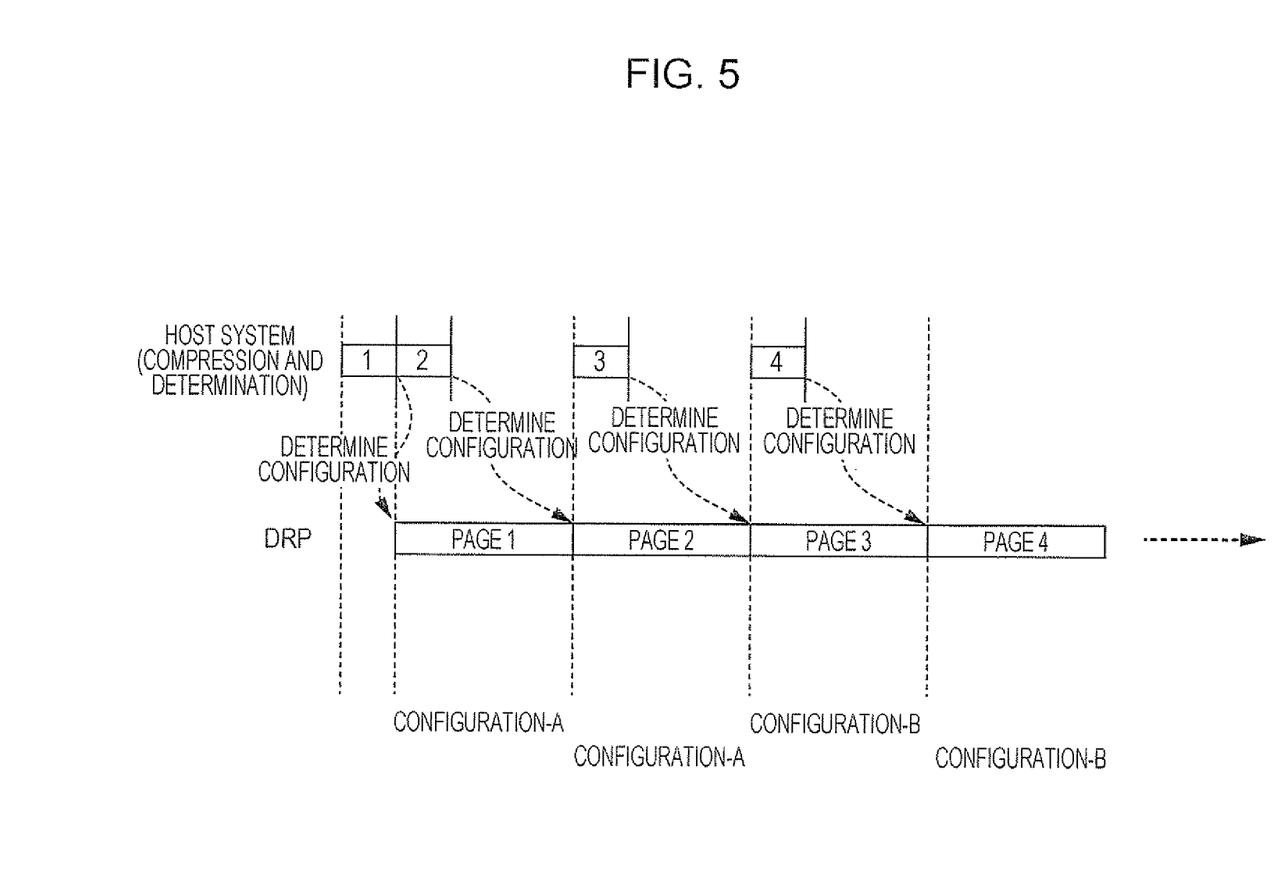
FIG. 5 illustrates another example of concurrent processing image compression and circuit configuration determination and another processing.

Another example of the concurrent processing is shown in FIG. 5. In this example, only single image processing using line memory devices is performed on a document including plural pages. In this example, the compression/maximum-compressed-line-length determining device 22 of the host system 20 first compresses image data of the first page of the document. Then, on the basis of the compressed line length of each line of the compressed image data, the configuration selector 26 selects the first circuit configuration 100A or the second circuit configuration 100B for the first page. In the example shown in FIG. 5, it is determined that the first circuit configuration 100A (used for compressed data, shown as "configuration-A" in FIG. 5) is to be employed. After this determination, in response to an instruction from the configuration selector 26, the reconfiguration controller 14 of the DRP 10 sets the first circuit configuration 100A in the reconfigurable circuit 12. Then, under the control of the output determining device 28, the selector 30 selects the compressed data so that the compressed data of the first page is supplied to the first circuit configuration 100A set in the reconfigurable circuit 12 via the selector 30. While the DRP 10 is performing image processing on the first page in this manner, the host system 20 selects the first circuit configuration 100A or the second circuit configuration 100B for the second page. In the example shown in FIG. 5, the "configuration-A" is selected for the second page. Accordingly, after completing the image processing for the first page, the "configuration-A" is maintained in the reconfigurable circuit 12 as it is, and the compressed data of the second page is supplied to the "configuration-A" and is processed. Then, while the DRP 10 is performing image processing on the second page, the host system 20 selects the second circuit configuration (used for raw data, shown as "configuration-B" in FIG. 5) for the processing of the third page. Then, after completing the image processing for the second page, the circuit configuration of the reconfigurable circuit 12 is changed to the "configuration-B". The selector 30 then selects raw data for the third page, and processes the raw data by using the "configuration-B" set in the reconfigurable circuit 12. As described above, in the example shown in FIG. 5, concerning the second and subsequent pages of the document, image data is compressed and the circuit configuration is determined while the DRP 10 is performing image processing on the page immediately prior to the page for which the circuit configuration is determined.

As is seen from the example shown in FIG. 4, when circuits for performing plural different types of image processing operations are sequentially reconfigured in the DRP 10, if the image processing a, which does not require line memory devices, is performed immediately before the image processing b, which requires line memory devices, the following concurrent processing is performed. After executing the image processing a for a subject page, while executing the image processing a for the page subsequent to the subject page, the circuit configuration for executing the image processing b for the subject page is determined.

As is seen from the examples shown in FIGS. 4 and 5, while the image processing b, which requires line memory devices, is being executed for the page prior to a subject page, the circuit configuration for executing the image processing b for the subject page is determined.

In this exemplary embodiment, as the circuit configuration of the DRP 10 for dealing with compressed data, plural circuit configurations among which the capacities of the line memory devices are different may be provided, and the circuit configuration for which the capacity of the line memory devices corresponds to the amount of compressed data of each page may be selected. Among the plural circuit configurations, although the lengths of the line memory devices are different, other configurations, such as the number of line memory devices, and the configurations of the decompression circuits 104a through 104e and the filter processing circuit 106, are the same. In this example, among the provided plural circuit configurations, the circuit configuration for which the line memory devices have the smallest capacity that can store the maximum compressed line length of a subject page determined by the compression/maximum-compressed-line-length determining device 22 is selected. This makes it possible to reduce the number of circuit elements of the reconfigurable circuit 12 used for performing image processing for this subject page and accordingly to increase the number of circuit elements that can be used for another processing.

Figure 6:
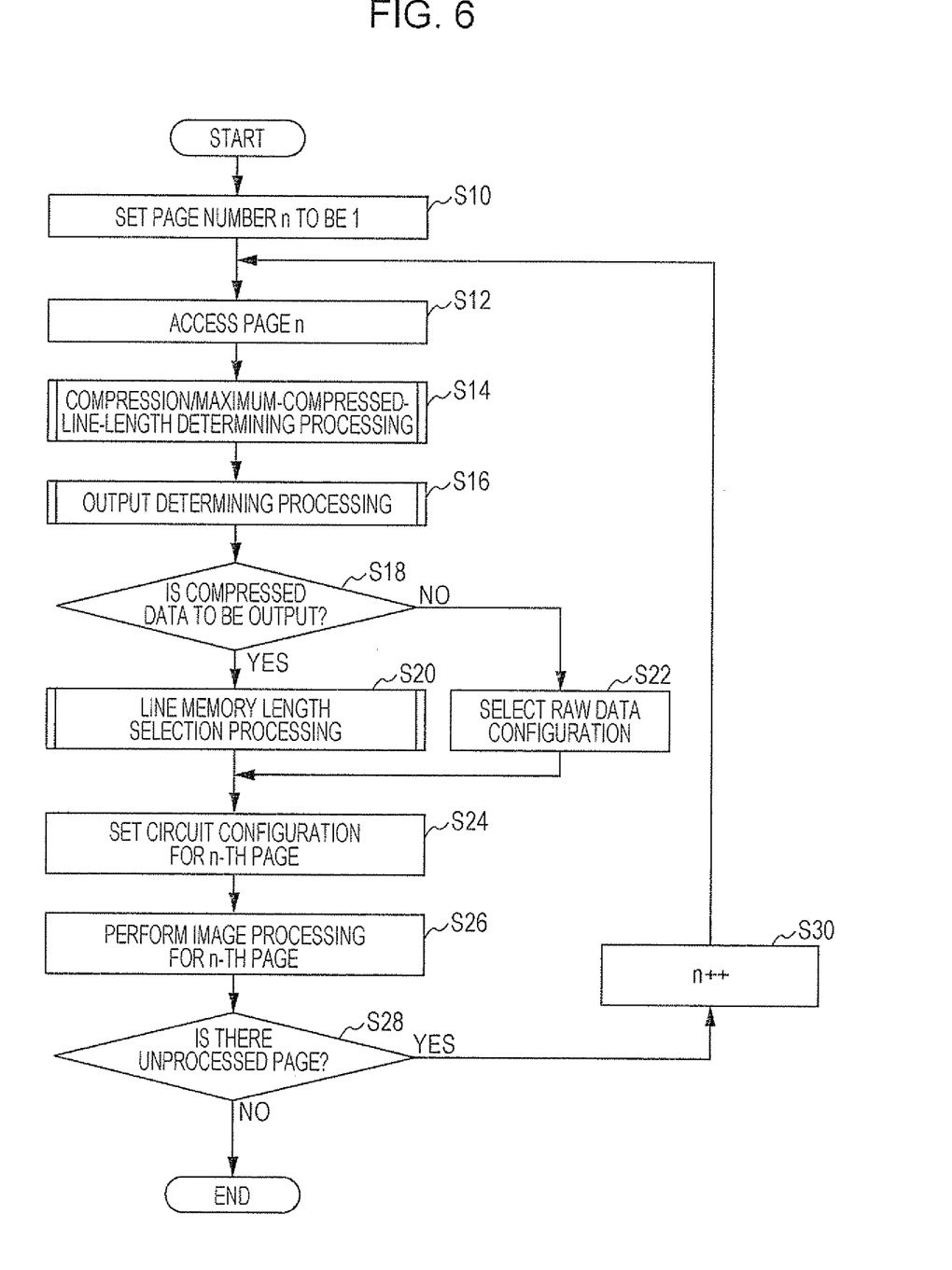
FIG. 6 is a flowchart illustrating an example of overall processing performed by the image data processing apparatus of an exemplary embodiment.

A description will now be given of an example of processing performed by the image data processing apparatus of this exemplary embodiment. FIG. 6 is a flowchart illustrating an example of the overall processing performed by the image data processing apparatus. The processing shown in FIG. 6 is image processing using line memory devices (which is referred to as "image processing X" for the sake of convenience).

In the processing shown in FIG. 6, in step S10, the controller 32 of the host system 20 sets the value of a variable n representing the page number to be 1 (i.e., the first page number of a document to be subjected to image processing X). In step S12, among the data elements of the subject document supplied from a host device to the memory 40, the controller 32 accesses image data of the n-th page of the document. In step S14, the controller 32 causes the compression/maximum-compressed-line-length determining device 22 to process the image data of the n-th page. As a result of step S14, compressed data of the n-th page is stored in the memory 40, and the maximum line length (maximum compressed line length Max-L) of the lines of the compressed data of the n-th page is stored in the Max-L retaining section 24. An example of detailed processing of step S14 will be discussed later with reference to FIG. 7.

After step S14, in step S16, the output determining device 28 determines whether compressed data or raw data (non-compressed data) of the n-th page is to be output to the DRP 10. An example of detailed processing of step S16 will be discussed later with reference to FIG. 8. It is then determined in step S18 whether compressed data is to be output. If the result of step S18 is YES, the controller 32 proceeds to step S20 to cause the configuration selector 26 to select a circuit configuration used for the processing of the n-th page among the plural first circuit configurations 100A among which the capacities of the line memory devices are different. An example of detailed processing of step S20 will be discussed later with reference to FIG. 10. If it is determined in step S18 that compressed data is not to be output, i.e., raw data is to be output, the controller 32 proceeds to step S22 to cause the configuration selector 26 to select the circuit configuration for raw data, i.e., the second circuit configuration 100B.

Then, when the time has arrived for the image processing X to be performed for the n-th page, in step S24, the controller 32 causes the configuration selector 26 to instruct the reconfiguration controller 14 of the DRP 10 to change the circuit configuration to the circuit configuration selected in step S20 or S22. If the circuit configuration selected in step S20 or S22 has already been set in the reconfigurable circuit 12, it is not necessary to change the circuit configuration. Then, in step S26, the controller 32 switches the selector 30 to compressed data or raw data in accordance with the determination result of step S16 obtained by the output determining device 28, and causes the circuit configuration set in the reconfigurable circuit 12 to process the compressed data or the raw data of the n-th page output via the selector 30. While executing steps S24 and 26, the host system 20 may execute steps 12 through S22 concurrently on the subsequent page.

It is then determined in step S28 whether there is an unprocessed page. If the result of step S28 is YES, the controller 32 proceeds to step S30 to increment the page number n by one, and then returns to step S12. If steps S12 through S30 are repeated for all the pages of the document, the result of step S28 is NO, and the processing of FIG. 6 is completed.

An example of the detailed processing of step S14 shown in FIG. 6 will be described below with reference to FIG. 7. In the processing shown in FIG. 7, the run-length compression format is used as the lossless compression processing. The processing shown in FIG. 7 is performed for each page of image data.

Figure 7:
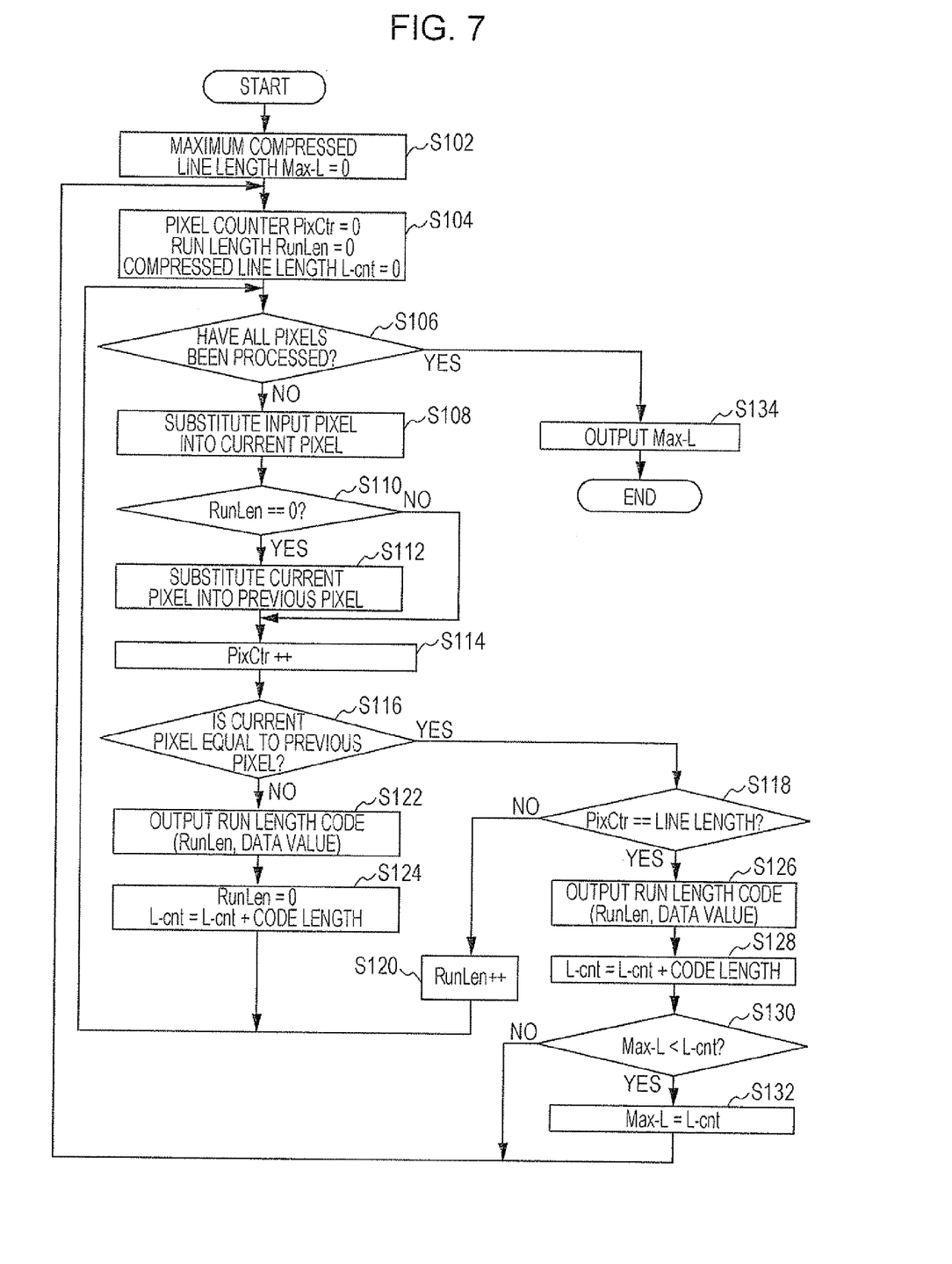
FIG. 7 is a flowchart illustrating an example of compression/maximum-compressed-line-length determining processing.

In the processing shown in FIG. 7, in step S102, the compression/maximum-compressed-line-length determining device 22 initializes the maximum compressed line length Max-L which is to be retained in the Max-L retaining section 24. In this example, the maximum compressed line length Max-L is initialized to 0. Then, in step S104, the compression/maximum-compressed-line-length determining device 22 initializes the variable of the pixel counter PixCtr indicating the subject pixel number in one line (scanning line), the variable of the line length RunLen, and the variable of the compressed line length L-cnt to 0. Then, the compression/maximum-compressed-line-length determining device 22 inputs data into each of the pixels of a subject page within the memory 40 in the raster scanning order sequentially from the first pixel until the last pixel. It is then determined in step S106 whether the pixel data has been input for all the pixels. If the result of step S106 is NO, the process proceeds to step S108. In step S108, every time data is input into one pixel, the value of the input pixel data is substituted into the variable "current pixel". Then, it is determined in step S110 whether the value of the current pixel counter PixCtr is 0. If the pixel counter PixCtr indicates 0, the process proceeds to step S112 in which the value of the current pixel is substituted into the variable "previous pixel" (one pixel prior to the "current pixel"). The reason for executing step S112 is to set the previous pixel for the first pixel of each line and is to initialize the previous pixel in the case that the run stops continuing (when the determination result of step S116 is NO). If it is determined in step S110 that the value of the current pixel counter PixCtr is not 0, step S112 is not executed. Then, in step S114, the compression/maximum-compressed-line-length determining device 22 increments the value of the pixel counter PixCtr by one.

Then, in step S116, the compression/maximum-compressed-line-length determining device 22 determines whether the pixel value of the current pixel is equal to that of the previous pixel. If the result of step S116 is YES, the process proceeds to step S118 to determine whether the value of the pixel counter PixCtr reaches the line length of the page (i.e., the number of pixels in the main scanning direction of the page). If the result of step S118 is NO, the process proceeds to steps S120 to increment the run length RunLen by one. The process then returns to step S106 to extract the subsequent pixel from the memory 40. In this case, since the run length RunLen is initialized to 0 in step S104, the result of step S110 is YES, and, in step S112, the value of the previous pixel is initialized to the value of the current pixel.

While the run continues, i.e., the pixels having the same value continue, the run length RunLen continues to be incremented in steps S116 through S120. Then, when the run stops continuing, i.e., if it is determined in step S116 that the value of the current pixel is different from that of the previous pixel, the process proceeds to step S122. In step S122, the code representing the run (run length code) is determined from a combination of the value of the current run length RunLen and the data value of the previous pixel. The determined run length code is added to the end of the compressed data of the subject page stored in the memory 40. Then, in step S124, the compression/maximum-compressed-line-length determining device 22 initializes the value of the run length RunLen to 0, and adds the code length of the run length code determined in step S122 to the compressed line length L-cnt. The process returns to step S106 to extract the value of the subsequent pixel from the memory 40. In this case, since the run length RunLen is not 0 after being incremented in step S120, the result of step S110 is NO, and step S112 is skipped.

In the processing shown in FIG. 7, encoding is performed for each line. Accordingly, even if it is determined in step S116 that the value of the current value is equal to that of the previous value, if it is determined in step S118 that the value of the pixel counter PixCtr reaches the line length, the process proceeds to step S126. In step S126, the compression/maximum-compressed-line-length determining device 22 determines the run length code representing that run from the value of the current run length RunLen and the data value of the previous pixel. Then, in step S128, the code length of the run length code determined in step S126 is added to the compressed line length L-cnt, and in step S130, the resulting total value is compared with the current maximum compressed line length Max-L retained in the Max-L retaining section 24. If it is determined in step S130 that the resulting total value is greater than the current Max-L, the process proceeds to step S132. In step S132, the total value is substituted into the current Max-L. If the resulting total value is not greater than the current Max-L, the value of Max-L is not updated. Then, the process returns to step S104, and the processing on the subsequent line is performed.

The above-described processing is repeated until the final pixel of the page. Then, if all the pixels of the page have been processed, the determination of step S106 is YES, and the process proceeds to step S134. In step S134, the compression./maximum-compressed-line-length determining device 22 outputs the value of the maximum compressed line length Max-L retained in the Max-L retaining section 24 to the controller 32 such that the maximum compressed line length Max-L is associated with the page number of the page. The controller 32 supplies the value of the maximum compressed line length Max-L to the configuration selector 26 and to the output determining device 28.

An example of the detailed processing in step S16 shown in FIG. 6 performed by the output determining device 28 will be described below with reference to FIG. 8. In the processing shown in FIG. 8, in step S142, the output determining device 28 determines whether the maximum compressed line length Max-L of the page supplied from the controller 32 is greater than the maximum value of the line memory lengths (maximum line memory length) of plural circuit configurations provided in the image data processing apparatus.

Figure 9:
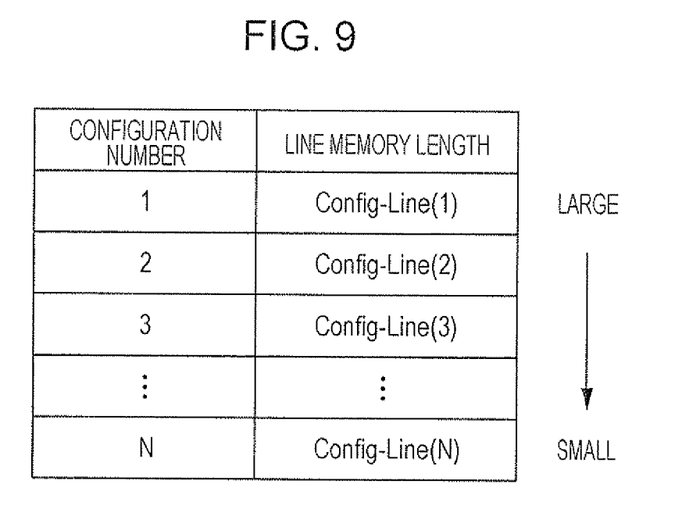
FIG. 9 illustrates an example of the data content of a database in which information concerning plural circuit configurations having different line memory lengths is stored.

For example, it is now assumed that, as the circuit configuration for performing certain image processing using line memory devices, N circuit configurations having different line memory lengths, as shown in FIG. 9, are provided in the image data processing apparatus of this exemplary embodiment. In the example shown in FIG. 9, as the number for identifying the circuit configuration ("configuration number") is smaller, the line memory length is greater. The circuit configuration having the configuration number 1 has the largest circuit scale. However, even the largest circuit scale of the N circuit configurations shown in FIG. 9 is smaller than that of the circuit configuration for raw data. In this case, the maximum line memory length is the line memory length Config-Line(1) of the configuration number 1. In step S142, the maximum compressed line length Max-L is compared with the line memory length Config-Line(1).

If Max-L is found to be greater than the maximum line memory length, i.e., if the result of step S142 is YES, the process proceeds to step S144 to determine that raw data is to be output to the DRP 10. If Max-L is found to be equal to or smaller than the maximum line memory length, i.e., if the result of step S142 is NO, the process proceeds to step S146 to determine that compressed data is to be output to the DRP 10.

Figure 8:
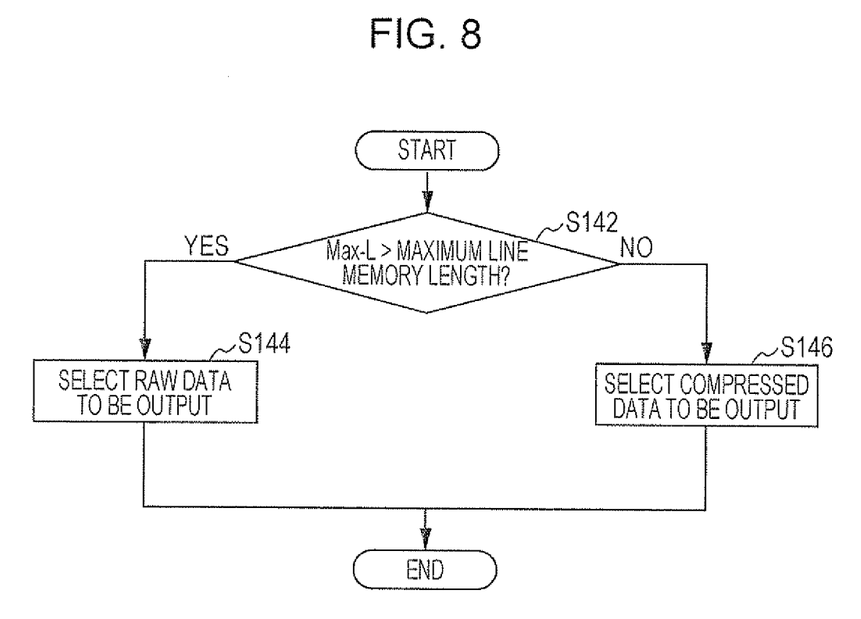
FIG. 8 is a flowchart illustrating an example of output determining processing.

The output determining device 28 retains a determination result for each page determined in the processing of FIG. 8 in a FIFO memory (not shown). Every time an instruction to output a new page is given from the controller 32, the output determining device 28 extracts the determination result at the head of the FIFO memory and switches the selector 30 in accordance with the determination result. Every time the controller 32 receives a signal indicating that image processing has finished for one page from the DRP 10, it instructs the output determining device 28 to output a new page.

Figure 10:
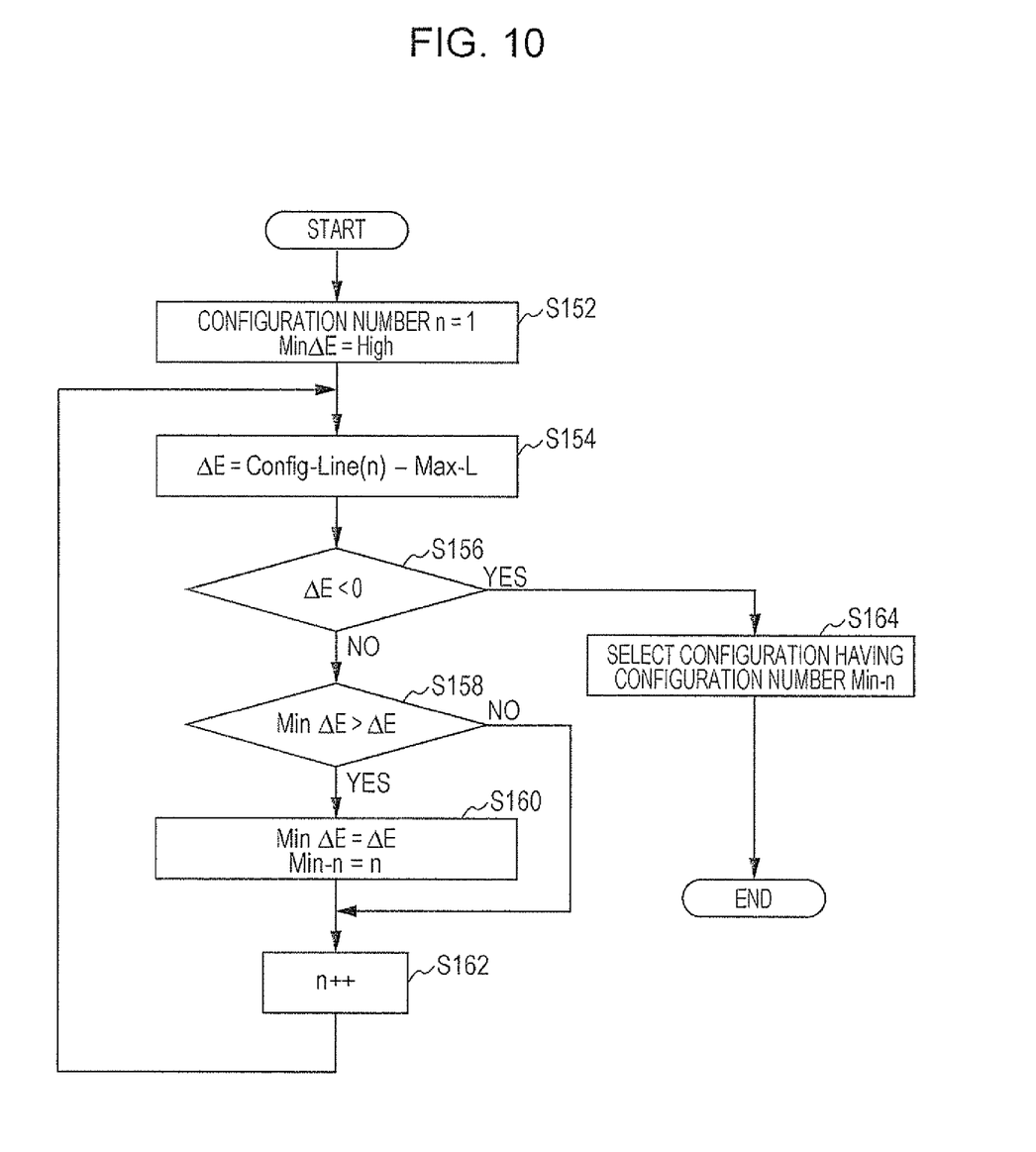
FIG. 10 is a flowchart illustrating an example of line memory length selection processing.

An example of the detailed processing in step S20 of FIG. 6 performed by the configuration selector 26 will be described below with reference to FIG. 10. It is assumed that, in order to perform this processing, the image data processing apparatus retains data representing the line memory lengths of the circuit configurations illustrated in FIG. 9. In step S152, the configuration selector 26 initializes the configuration number n for identifying the circuit configuration to 1. The configuration selector 26 also initializes the minimum value MinΔE of the subtraction results ΔE obtained by subtracting the maximum compressed line length Max-L from the line memory length Config-Line(n) of the n-th circuit configuration. In this case, the configuration selector 26 initializes the minimum value MinΔE to a predetermined large constant (shown as "High" in FIG. 10). That is, in this processing, it is determined whether each circuit configuration is suitable for the subject page in ascending order of the circuit number, i.e., in descending order of the line memory length. Then, in step S154, the configuration selector 26 calculates subtraction result ΔE, and determines in step S156 whether ΔE is smaller than 0. The processing shown in FIG. 10 is executed only when it is determined in step S16 (processing shown in FIG. 8) that Max-L is equal to or smaller than the maximum line memory length (i.e., smaller than the line memory length of the configuration number 1). Accordingly, when the configuration number n is 1, ΔE determined in step S154 is always positive, and thus, the result of step S156 is NO. Then, the configuration selector 26 determines in step S158 whether ΔE is smaller than MinΔE. If the result of step S158 is YES, the process proceeds to step S160 in which ΔE is substituted into MinΔE and the current configuration number n is substituted into the variable Min-n. The variable Min-n is a variable for retaining the optimum circuit configuration number for the subject page (i.e., the circuit configuration having the minimum line memory length among the circuit configurations whose line lengths are equal to or greater than the maximum compressed line length). After step S160, the process proceeds to step S162 in which the value of the configuration number n is incremented by one, i.e., the circuit configuration whose line length is one step smaller than that of the current circuit configuration is to be processed. The process then returns to step S154.

Then, steps S154 through S162 are repeated until the determination result of step S156 is YES (i.e., ΔE is smaller than 0). If the result of step S156 is YES, the process proceeds to step S164 in which the variable Min-n is set to be the identification number of the optimum circuit configuration for the subject page.

The configuration selector 26 retains the identification number of the optimum circuit configuration for each page determined in the processing of FIG. 10 in a FIFO memory (not shown). Every time an instruction to reconfigure the circuit for a new page is given from the controller 32, the configuration selector 26 extracts the identification number at the head of the FIFO memory and instructs the reconfiguration controller 14 to switch the circuit configuration to the circuit configuration having the identification number. Every time the controller 32 receives a signal indicating that image processing has finished for one page from the DRP 10, it instructs the configuration selector 26 to reconfigure the circuit for a new page.

The host system 20 of the image data processing apparatus of the above-described exemplary embodiment is implemented by causing, for example, a general-purpose computer, to execute a program describing the processing contents of the above-described individual functional modules of the host system 20. The computer has a hardware circuit configuration in which a microprocessor, such as a central processing unit (CPU), memory devices (primary storage devices), such as a RAM and a read only memory (ROM), an hard disk drive (HDD) controller for controlling an HDD, various input/output (I/O) interfaces, a network interface for controlling the connection with a network, such as a local area network, are connected to one another via a bus. Additionally, a disk drive for reading and/or writing data from and/or into portable disk recording media, such as a compact disc (CD) or a digital versatile disk (DVD), or a memory reader/writer for reading and/or writing data from and/or into various portable non-volatile recording media, such as a flash memory, may be connected to the bus via, for example, an I/O interface. The program describing the processing contents of the above-described functional modules is stored in a fixed storage device, such as an HDD, through the use of a recording medium, such as a CD or a DVD, or a communication medium, such as a network, and is then installed in the computer. The program stored in the fixed storage device is read to the RAM and is executed by the microprocessor, such as a CPU, thereby implementing the above-described functional modules. Some or all of the functional modules may be constituted by a hardware circuit, such as a dedicated large scale integration (LSI), an application specific integrated circuit (ASIC), or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image data processing apparatus comprising:
  a lossless compression device that performs lossless compression for each line of image data;
  a configuration controller that performs control so that a first configuration and a second configuration are selectively set in a reconfigurable circuit, the first configuration including a first line memory set for retaining therein compressed image data obtained by performing lossless compression by using the lossless compression device and a decompression circuit set for decompressing the compressed image data, the second configuration including a second line memory set for retaining therein the image data in the form of non-compressed image data, a capacity of the first line memory set being determined so that a circuit scale of the first configuration is equal to or smaller than a circuit scale of the second configuration;
  a maximum size determining device that causes the lossless compression device to compress each of the lines of a unit of processing of the image data and that determines a maximum size among data sizes of the lines of the compressed image data; and
  an output controller that performs control so that, when the maximum size determined by the maximum size determining device is equal to or smaller than a predetermined threshold which corresponds to the capacity of the first line memory set, the output controller instructs the configuration controller to set the first configuration in the reconfigurable circuit and also outputs the compressed image data obtained by the lossless compression device to an image processing circuit via the first line memory set, and so that, when the maximum size determined by the maximum size determining device is greater than the predetermined threshold, the output controller instructs the configuration controller to set the second configuration in the reconfigurable circuit and also outputs the non-compressed image data to the image processing circuit via the second line memory set.

2. The image data processing apparatus according to claim 1, wherein:
the first configuration includes a plurality of first configurations among which the capacities of the first line memory sets are different;
the configuration controller selectively sets the plurality of first configurations in the reconfigurable circuit; and
among the plurality of first configurations, the output controller identifies first configurations for which the capacities of the first line memory sets are equal to or greater than the maximum size determined by the maximum size determining device, and instructs the configuration controller to set the first configuration for which the capacity of the first line memory set is the smallest.

3. The image data processing apparatus according to claim 1, wherein when the maximum size of the lines of a unit of processing of the compressed image data determined by the maximum size determining device is equal to or smaller than the predetermined threshold, the output controller stores the compressed image data obtained for the maximum size determining device to determine the maximum size, and outputs the stored compressed image data to the image processing circuit via the first line memory set when processing the unit of processing of the compressed image data by using the image processing circuit.

4. The image data processing apparatus according to claim 2, wherein when the maximum size of the lines of a unit of processing of the compressed image data determined by the maximum size determining device is equal to or smaller than the predetermined threshold, the output controller stores the compressed image data obtained for the maximum size determining device to determine the maximum size, and outputs the stored compressed image data to the image processing circuit via the first line memory set when processing the unit of processing of the compressed image data by using the image processing circuit.

5. The image data processing apparatus according to claim 3, wherein, while the output controller is outputting compressed data or non-compressed data of a certain unit of processing of the image data to the image processing circuit via the first line memory set or the second line memory set, respectively, the lossless compression device and the maximum size determining device respectively perform lossless compression and determination of the maximum size concerning another unit of processing of the image data, which is subsequent to the certain unit of processing of the image data.

6. The image data processing apparatus according to claim 4, wherein, while the output controller is outputting compressed data or non-compressed data of a certain unit of processing of the image data to the image processing circuit via the first line memory set or the second line memory set, respectively, the lossless compression device and the maximum size determining device respectively perform lossless compression and determination of the maximum size concerning another unit of processing of the image data, which is subsequent to the certain unit of processing of the image data.

7. The image data processing apparatus according to claim 3, wherein, while a third circuit configuration without a line memory set which is set in the reconfigurable circuit is executing processing for a certain unit of processing of the image data, the lossless compression device and the maximum size determining device respectively perform lossless compression and determination of the maximum size concerning another unit of processing of the image data, which is prior to the certain unit of processing of the image data.

8. The image data processing apparatus according to claim 4, wherein, while a third circuit configuration without a line memory set which is set in the reconfigurable circuit is executing processing for a certain unit of processing of the image data, the lossless compression device and the maximum size determining device respectively perform lossless compression and determination of the maximum size concerning another unit of processing of the image data, which is prior to the certain unit of processing of the image data.

9. The image data processing apparatus according to claim 5, wherein, while a third circuit configuration without a line memory set which is set in the reconfigurable circuit is executing processing for a certain unit of processing of the image data, the lossless compression device and the maximum size determining device respectively perform lossless compression and determination of the maximum size concerning another unit of processing of the image data, which is prior to the certain unit of processing of the image data.

10. The image data processing apparatus according to claim 6, wherein, while a third circuit configuration without a line memory set which is set in the reconfigurable circuit is executing processing for a certain unit of processing of the image data, the lossless compression device and the maximum size determining device respectively perform lossless compression and determination of the maximum size concerning another unit of processing of the image data, which is prior to the certain unit of processing of the image data.

11. An image data processing method comprising:
performing lossless compression for each line of image data;
performing control so that a first configuration and a second configuration are selectively set in a reconfigurable circuit, the first configuration including a first line memory set for retaining therein compressed image data obtained by performing lossless compression and a decompression circuit set for decompressing the compressed image data, the second configuration including a second line memory set for retaining therein the image data in the form of non-compressed image data, a capacity of the first line memory set being determined so that a circuit scale of the first configuration is equal to or smaller than a circuit scale of the second configuration;
when compressing each of the lines of a unit of processing of the image data, determining a maximum size among data sizes of the lines of the compressed image data; and
performing control so that, when the determined maximum size is equal to or smaller than a predetermined threshold which corresponds to the capacity of the first line memory set, the first configuration is set in the reconfigurable circuit and the obtained compressed image data is output to an image processing circuit via the first line memory set, and so that, when the determined maximum size is greater than the predetermined threshold, the second configuration is set in the reconfigurable circuit and the non-compressed image data is output to the image processing circuit via the second line memory set.

12. A non-transitory computer readable medium storing a program causing a computer to execute a process, the process comprising:
performing lossless compression for each line of image data;
performing control so that a first configuration and a second configuration are selectively set in a reconfigurable circuit, the first configuration including a first line memory set for retaining therein compressed image data obtained by performing lossless compression and a decompression circuit set for decompressing the compressed image data, the second configuration including a second line memory set for retaining therein the image data in the form of non-compressed image data, a capacity of the first line memory set being determined so that a circuit scale of the first configuration is equal to or smaller than a circuit scale of the second configuration;

when compressing each of the lines of a unit of processing of the image data, determining a maximum size among data sizes of the lines of the compressed image data; and performing control so that, when the determined maximum size is equal to or smaller than a predetermined threshold which corresponds to the capacity of the first line memory set, the first configuration is set in the reconfigurable circuit and the obtained compressed image data is output to an image processing circuit via the first line memory set, and so that, when the determined maximum size is greater than the predetermined threshold, the second configuration is set in the reconfigurable circuit and the non-compressed image data is output to the image processing circuit via the second line memory set.

* * * * *